3,230,199
POLYURETHANES CURED WITH ISOCYANATES
AND PEROXIDES OR SULPHUR
Cornelius Mühlhausen and Karl L. Schmidt, Leverkusen,
 Germany, assignors to Farbenfabriken Bayer Aktienge-
 sellschaft, Leverkusen, Germany, a German corporation
No Drawing. Filed Sept. 28, 1960, Ser. No. 58,904
Claims priority, application Germany, Sept. 29, 1959,
F 29,490
8 Claims. (Cl. 260—75)

This invention relates to polyurethane plastics and a method for making the same and, more particularly, to hard, highly cross-linked polyurethane plastics suitable for use as a substitute for hard rubber and steel.

The preparation of polyurethane plastics from predominately linear polyhydroxy compounds such as polyesters, polyhydric polyalkylene ethers or polyhydric polythioethers having a molecular weight above about 750 and organic polyisocyanates and, if necessary, chain-lengthening agents such as glycols, diamines, water, amino alcohols and the like is well known. Such polyurethanes may be prepared in various ways in the form of storable prepolymers which can be processed on rubber rollers and/or injection molding machines. In the simplest case a hydroxyl polyester having a molecular weight above about 750 is reacted with less than enough organic polyisocyanate to react with all of the free hydroxyl groups. A millable gum is obtained which has terminal hydroxyl groups and which may be further reacted on a rubber roller with an organic polyisocyanate, a peroxide or sulfur and then pressed into molds and cured to form polyurethane plastics. Alternately, the polyhydroxy compound may be reacted with an excess of polyisocyanate to obtain a prepolymer having terminal —NCO groups which is thereafter reacted with an excess of a chain-extending agent such as a glycol, a diamine or water to produce a millable gum which may also be cured with a polyisocyanate, a peroxide or sulfur. Where the components making up the polyurethane prepolymer contain some ethylenic unsaturation, the vulcanization with a peroxide or sulfur is especially advantageous. The presence of unsaturated bonds is not essential, however, for vulcanization of the polyurethane mass with a peroxide or sulfur.

In the preparation of polyurethane plastics by these processes wherein cross-linked plastics of high molecular weight are produced from a storable intermediate product there are obtained elastomeric materials which often suffer severe deterioration of their physical properties when an attempt is made to increase the hardness thereof. Heretofore, it has not been possible to produce highly cross-linked, hard plastics which retained high rebound elasticity and good physical properties in other respects.

It is, therefore, an object of this invention to produce highly cross-linked polyurethane plastics having high hardness and good physical properties. Another object of this invention is to provide highly cross-linked polyurethane plastics having mechanical properties comparable to those of strongly vulcanized rubber. Still another object of this invention is to provide cross-linked polyurethane plastics which have high hardness without decreasing the other physical properties of the material. Still a further object of the invention is to provide a method of making highly cross-linked plastics. A further object of the invention is to provide a method of cross-linking storable polyurethane masses to produce highly cross-linked polyurethane plastics having improved hardness. Still another object of this invention is to produce highly cross-linked polyurethane plastics from a storage-stable intermediate compound having active hydrogen containing groups and an organic polyisocyanate.

The foregoing objects and others which will become apparent from the following description are accomplished in accordance with the invention, generally speaking, by providing polyurethane plastics prepared by a process which comprises mixing an organic polyisocyanate modified storable prepolymer having terminal hydroxyl groups with an organic polyisocyanate and an organic peroxide or sulfur and heating the resulting mixture in a mold to bring about cross-linking thereof to form a hard polyurethane plastic. Thus, this invention provides a process for the preparation of hard polyurethane plastics wherein a polyurethane prepolymer is prepared in a first step by reacting an organic polyisocyanate with an organic compound containing at least two active hydrogen containing groups as determined by the Zerewitinoff method and optionally a chain-extending agent to prepare a prepolymer having terminal hydroxyl groups which is then combined with an organic polyisocyanate and sulfur or an organic peroxide optionally also in the presence of a glycol and then heating in a mold to form a polyurethane plastic. Exceptionally hard masses are produced by the process of this invention which may even be used as a replacement for steel.

The organic compounds containing at least two active hydrogen containing groups according to the Zerewitinoff method which are used in the initial preparation of the prepolymer preferably have a molecular weight above about 50 and are, for example, hydroxyl polyesters obtained from polyhydric alcohols and polycarboxylic acids, polyhydric polyalkylene ethers, polyhydric polythioethers, polyacetals and the like.

Any suitable hydroxyl polyester may be used such as, for example, those produced by the thermal condensation of a polycarboxylic acid and a polyhydric alcohol. Any suitable polycarboxylic acid may be used such as, for example, succinic, oxalic, adipic, methyladipic, sebacic, glutaric, pimelic, azelaic, suberic, and the like; aromatic carboxylic acids including phthalic, terephthalic, isophthalic, 1,2,4-benzene tricarboxylic, and the like; sulphur containing acids such as, for example, thiodiglycolic, thiodipropionic and the like; unsaturated acids such as, for example, maleic, fumaric, itaconic, citraconic, and the like. Any suitable polyhydric alcohol may be used such as, for example, ethylene glycol, diethylene glycol, propylene glycol, 1,3-butylene glycol, 1,6-hexane diol, trimethylol propane, pentaerythritol, glycerine, 1,2,6-hexanetriol and the like.

Any suitable polyhydric polyalkylene ether may be used, such as, for example the product obtained by polymerizing alkylene oxides or the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, 1,6-hexane diol, 1,2,6-hexanetriol, and the like. Any suitable alkylene oxide may be used such as, for example, ethylene oxide, propylene oxide, butylene oxide, amylene oxide, and the like. The polyhydric polyalkylene ethers may be prepared by any known process such as, for example, the process described in Wurtz in 1859 and in "Encyclopedia of Chemical Technology" Volume 7, pages 257 to 262 published by Interscience Publishers Inc. (1951) or in U.S. Patent 1,922,459.

Any suitable polyhydric polythioether may be used such as, for example, the reaction product of one of the aforementioned alkylene oxides used in the preparation of polyhydric polyalkylene ethers with a thioether glycol such as, for example, thiodiglycol, 3,3'-dihydroxypropyl sulfide, 4,4'-dihydroxybutyl sulfide, 1,4-(beta hydroxy ether) phenylene dithioether and the like.

Any suitable polyester amide may be used such as, for example, the reaction product of an amine and/or amino alcohol with a carboxylic acid. Any suitable amine such as, for example, ethylene diamine, propylene diamine, and the like may be used. Any suitable amino alcohol, such as, for example, 1-hydroxy, 2-amino ethylene, and the like may be used. Any suitable polycarboxylic acid may be used such as, for example, those more particularly disclosed above for the preparation of hydroxy polyesters.

Any suitable polyacetal may be used such as, for example, the reaction product of an aldehyde and a polyhydric alcohol. Any suitable aldehyde may be used such as, for example, formaldehyde, paraldehyde, butyraldehyde, and the like. Any of the polyhydric alcohols mentioned above in the preparation of the hydroxyl polyesters may be used.

Any suitable organic compound containing activated methylene groups may be used such as, for example, compounds containing enolizable hydrogen atoms, such as, for example, aceto acetic ester, diethyl malonate, methyl-m-butyl malonate, acetyl acetone, acetonyl acetone, and the like.

It is preferred that the organic compounds containing at least two active hydrogen containing groups have a molecular weight above about 750, with hydroxyl numbers of from about 25 to about 600 and acid numbers below about 5. A satisfactory upper limit for the molecular weight is about 10,000 and most preferred hydroxyl numbers are within the range of about 40 to about 100.

In accordance with the invention, any suitable organic compound containing at least two active hydrogen containing groups as determined by the Zerewitinoff method which are reactive with isocyanate groups and which have a molecular weight of less than about 500 may be used in the preparation of the storage stable intermediate product by reaction thereof with the isocyanate-modified prepolymer. Such compounds include, for example, glycols containing urea groups such as, the reaction product of 1 mol of urea with 2 mols of ethylene oxide, the reaction product of 1 mol oxazolidone with 1 mol ethanolamine, the reaction product of 1 mol of diethanolamine with 1 mol of potassium cyanate, glycols containing urethane linkages such as, for example, the reaction product of one of the aforementioned compounds containing active hydrogen containing groups, which groups are reactive with isocyanate groups with a deficiency of a polyisocyanate, glycols containing carbonamide groups such as, for example, the re-esterification product of 1 mol of the ethanol-bis-ester of adipic acid with 2 mols of ethanolamine, glycols containing ester groups such as, for example, the reaction product of a polycarboxylic acid with an excess of a polyhydric alcohol and compounds containing tertiary nitrogen atoms such as, for example, triethanol amine, tripropanol amine, and the like. Other compounds suitable for use as the organic compound containing active hydrogen containing groups, which groups are reactive with isocyanate groups and which has a molecular weight less than about 500 include water, simple glycols, such as, for example, ethylene glycol, propylene glycol, butylene glycol, amylene glycol, trimethylol propane, glycerine, pentaerythritol, 1,2,6-hexane triol, and the like; glycols having aromatic ring systems such as, for example, 1,5-naphthalene-beta-dihydroxyethyl ether, hydroquinone-beta-dihydroxyethyl ether, and the like; diamines such as, for example, o-dichlorobenzidine, 2,5-dichloro-p-phenylene diamine, 3,3'-dichloro-4,4'-diaminodiphenylmethane, hydrazine; amino alcohols such as for example ethanolamine, diethanolamine, triethanolamine, and the like; amino carboxylic acids such as, for example, beta-aminopropionic acid, piperidic acid, glycine, m-aminobenzoic acid, aminobenzoic acid, aminosuccinic acid, anthranilic acid and the like; and hydroxy carboxylic acids such as, for example, beta-hydroxy-propionic acid, alpha and beta hydroxy butyric acids, m-hydroxy benzoic acid, p-hydroxybenzoic acid, salicylic acid and the like.

Any suitable organic polyisocyanate may be used in the preparation of the storage stable intermediate product but organic diisocyanates are preferred such as, for example, 4,4'-diphenylmethane diisocyanate, the substitution products of 4,4'-diphenylmethane diisocyanate such as, for example, diphenyldimethylmethane-4,4'-diisocyanate, 2,4-tolylene diisocyanate, 2,6-tolylene diisocyanate, m-phenylene diisocyanate, p-phenylene diisocyanate, 1,4-naphthylene diisocyanate, 1,5-naphthylene diisocyanate, diphenyl-4,4'-diisocyanate, azobenzene-4,4'-diisocyanate, diphenyl sulfone - 4,4' - diisocyanate, dicyclohexane - 4,4' - diisocyanate, tetramethylene diisocyanate, hexamethylene diisocyanate, p,p',p"-triphenylmethane triisocyanate and the like. It is to be understood that any suitable diisocyanate may be used including diisocyanates containing substituted urea groups such as, for example, the reaction product of 2 mols of 2,4-tolylene diisocyanate with 1 mol of water.

The storage stable intermediate reaction product is prepared by reacting an organic compound containing at least two active hydrogen containing groups as determined by the Zerewitinoff method, which groups are reactive with isocyanate and preferably having a molecular weight of at least about 750 and, if desired, an organic compound containing at least two active hydrogen containing groups, which groups are reactive with isocyanate groups and having a molecular weight of less than about 500 with a deficiency of an organic polyisocyanate. The storage stable intermediate may be prepared, for example, by reacting the organic compound having a molecular weight of at least about 750 with a quantity of an organic polyisocyanate less than that calculated to react with the active hydrogen groups of the compound having a molecular weight of at least about 750, admixing the reaction product of the organic polyisocyanate and the organic compound having a molecular weight of about 750 with the organic compound having a molecular weight of less than about 500 and completing the reaction with an additional amount of organic polyisocyanate. The reaction to prepare the storage stable intermediate product may also be carried out by reacting an excess of a suitable organic polyisocyanate with the organic compound having a molecular weight of at least about 1000 and subsequently admixing therewith a quantity of the compound having a molecular weight of less than about 500, which quantity is at least sufficient to react with all of the isocyanate groups present. The storage stable intermediate product can also be prepared by mixing the organic compound having a molecular weight of at least about 750 and the organic compound having a molecular weight less than about 500 with a deficiency of a suitable organic polyisocyanate.

Any suitable organic peroxide may be used, such as, for example, dicumyl peroxide, benzoyl peroxide, cyclohexanone hydroperoxide, methylethyl ketone peroxide, cumene hydroperoxide, diacetyl peroxide, succinyl peroxide and the like. Dicumyl peroxide is particularly preferred. The peroxide or sulfur is preferably incorporated into the storage stable intermediate, which has been prepared as shown above, in the cold state on a conventional mixer, for example on rubber mixing rollers, it being possible simultaneously to incorporate fillers such as carbon black and lubricants such as stearic acid into the intermediate masses. When vulcanization is effected with sulfur it is also possible simultaneously to incorporate rubber auxiliaries such as accelerators into the intermediate masses. The peroxides are preferably employed in an amount of from about 1 to about 10 percent by weight based on the balance of the mixture. Peroxides in the form of pastes or powders are particularly preferred. Sulfur is preferably employed in an amount of from about 0.1 to about 10 percent by weight and preferably in an amount of from about 1 to about 5 percent based on the weight of the balance of the mixture. The cross-linking may be effected as a separate step after shaping or alternatively the cross-linking and shaping may be carried out simultaneously under the vulcanization conditions normally employed in the rubber industry and preferably at a temperature above 100° C.

Any suitable organic polyisocyanate may be used in the second step of the reaction set forth in the immediately preceding paragraph to cause the cross-linking of the storage stable intermediate such as, for example, 4,4'-diphenylmethane diisocyanate the substitution products of 4,4'-diphenylmethane diisocyanate such as, diphenyldimethylmethane-4,4'-diisocyanate, 2,4 - toluylene diisocyanate, 2,6-toluylene diisocyanate, mixtures of 2,4- and 2,6-toluylene diisocyanate, p-phenylene diisocyanate, m-phenylene diisocyanate, 1,4-naphthylene diisocyanate, 1,5-naphthylene diisocyanate, diphenyl-4,4'-diisocyanate, azobenzene-4,4'-diisocyanate, diphenyl sulfone-4,4'-diisocyanate, dicyclohexane-4,4'-diisocyanate, tetramethylene diisocyanate, hexamethylene diisocyanate, dionisidine diisocyanate, m-xylylene diisocyanate, benzidine diisocyanate and urea diisocyanate which is prepared by reacting 2 mols of 2,4-toluylene diisocyanate with 1 mol of water. Other suitable polyisocyanates include urethdione diisocyanates which are prepared in a known manner by dimerizing aromatic diisocyanates such as, for example, 2,4-toluylene diisocyanate, or 1-chloro-2,4-phenylene diisocyanate; triisocyanates such as, for example, triphenylmethane-4,4',4''-triisocyanate, the reaction product of 1 mol of trimethylol propane with 3 mols of toluylene diisocyanate and the like.

In accordance with a preferred embodiment of this invention the storage stable intermediate product is compounded with an organic peroxide or sulfur, an organic polyisocyanate and an organic compound containing at least two active hydrogen containing groups as determined by the Zerewitinoff method which groups are reactive with isocyanate groups and having a molecular weight of less than 500 and then pressed into a mold and vulcanized preferably at a temperature above about 100° C. to produce exceptionally hard polyurethane plastics. The working examples set forth below illustrate that by the process of the present invention it is possible to produce plastics which have improved physical properties over those obtained when either the polyisocyanate or sulfur or the organic peroxide was used alone to prepare the polyurethane plastics. Furthermore, the products obtained by the process of the present invention are more resistant to organic solvents than those obtained when the storage stable intermediate is cross-linked with the polyisocyanate alone. Still further the products of the present invention are more resistant to swelling caused by solvents than the heretofore known polyurethane plastics.

Any suitable organic compound containing active hydrogen containing groups, which groups are reactive with isocyanate groups and having a molecular weight less than about 500 may be used such as, for example, those glycols and amines set forth above for the organic compound having a molecular weight less than 500 used in the preparation of the storage stable intermediate. It is preferred that the organic compound have terminal hydroxyl or amino groups.

By the process of this invention plastic products having combinations of properties heretofore unknown are obtained. These plastic products have high degree of hardness, a considerable rebound elasticity and a relatively high breaking elongation. The products of this invention find utility as construction elements in the manufacture of machines and particularly for damping vibrations and for transmitting power. These materials may also be used as substitutes for highly vulcanized natural rubber and synthetic rubber and in some cases as substitutes for steel. A particularly suitable use for the plastic compositions of this invention is in the handles of pneumatic drilling equipment, bearing boxes, gear wheels, buffers or couplings.

The invention is further illustrated by the following examples in which the parts are by weight unless otherwise indicated.

Example 1

About 100 parts of an adipic acid-diethylene glycol-polyester (—OH number about 56) are mixed at about 90° C. with about 4.4 parts of butene-1,4-diol and about 17 parts of toluylene 2,4-diisocyanate. The reaction product is heated for approximately another 15 hours at about 90° C. An acetone-soluble tacky polyurethane mass is obtained which is similar to a highly masticated natural rubber and which has a Mooney plasticity of about 3, measured at about 100° C. after about 10 minutes.

About 100 parts of the material thus prepared are mixed on a rubber roller with about 0.5 part of stearic acid about 30 parts of activated carbon black and either (a) About 10 parts of dimeric 2,4-toluylene diisocyanate, or
(b) About 2 parts of dicumyl peroxide, or
(c) About 10 parts of dimeric 2,4-toluylene diisocyanate and about 2 parts of dicumyl peroxide, or
(d) About 30 parts of dimeric 2,4-toluylene diisocyanate, about 12.5 parts of hydroquinone-β-dihydroxyethyl ether, and
About 2 parts of dicumyl peroxide.

The four mixtures are pressed for about 30 minutes at about 140° C. Cross-linked plastics are obtained which have the following strength properties:

| | Tensile strength, kg./cm.$^2$ | Breaking elongation, percent | Shore hardness, A | Brinell hardness after 60'' | Lead in kg./cm.$^2$— | | Limiting bending stress, kg./cm.$^2$ |
|---|---|---|---|---|---|---|---|
| | | | | | at 20% | at 300% | |
| a | 121 | 400 | 71 | | 25 | 80 | |
| b | 143 | 335 | 65 | | 32 | 118 | |
| c | 372 | 328 | 79 | | 40 | 350 | |
| d | 363 | | | 305 | | | 225 |

Specimen d cannot be compared with specimens a to c as regards all the properties indicated because of its remarkable and extreme hardness.

Example 2

About 100 parts of polybutylene glycol (—OH number about 58) are reacted for about 15 minutes at about 130° C. with about 12.7 parts of p-phenylene diisocyanate. About 3.5 parts of butene-1,4-diol are also incorporated by stirring. The reaction product is hereafter heated for approximately another 15 hours at about 90° C., whereby a rubber-like polyurethane mass is obtained. The rubber-like polyurethane mass has a Mooney plasticity of about 2, measured at about 100° C. after about 10 minutes.

About 100 parts of the material thus prepared are mixed on a rubber roller with about 0.5 part of stearic acid, about 20 parts of activated carbon black and either (a)

About 8 parts of bis-4,4'-dimethyl-3,3'-diisocyanatodiphenyl urea; or (b)

About 1.5 parts of sulfur,
About 1 part of mercaptobenzthiazole,
About 3 parts of dibenzthiazyl disulphide, and
About 0.2 part of zinc chloride; or (c)

About 1.5 parts of sulphur,
About 1 part of mercaptobenzthiazole,
About 3 parts of dibenzthiazyl disulphide,
About 0.2 part of zinc chloride, and
About 8 parts of bis-4,4'-dimethyl-3,3'-diisocyanatodiphenyl urea; or (d)

About 1.5 parts of sulphur,
About 1 part of mercaptobenzthiazole,
About 3 parts of dibenzthiazyl disulphide,
About 0.2 part of zinc chloride,
About 25 parts of bis-4,4'-dimethyl-3,3'-diisocyanatodiphenyl urea, and
About 13 parts of naphthalene-β-dihydroxyethyl ether.

These four mixtures are pressed for about 30 minutes at about 150° C., whereby plastics are formed which have the following strength properties:

| | Tensile strength, kg./cm.$^2$ | Breaking elongation, percent | Shore hardness, A | Brinell hardness after 60" | Lead in kg./cm.$^2$— | | Limiting bending stress, kg./cm.$^2$ |
|---|---|---|---|---|---|---|---|
| | | | | | at 20% | at 300% | |
| a | 84 | 250 | 70 | | 14 | | |
| b | 78 | 254 | 62 | | 17 | | |
| c | 265 | 465 | 73 | | 25 | 153 | |
| d | 315 | | | 295 | | | 255 |

Specimen d cannot be compared with specimens a to c as regards all the properties indicated on account of its remarkable and extreme hardness.

It is to be understood that the foregoing examples are for the purpose of illustration and that other reactants may be substituted therein in accordance with the preceding disclosure with satisfactory results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the preparation of polyurethane plastics which comprises mixing an isocyanate-modified prepolymer obtained by a process which comprises reacting an organic polyisocyanate with an excess of an organic compound containing at least two active hydrogen containing groups as determined by the Zerewitinoff method and having a molecular weight of at least about 750 with an organic polyisocyanate and an effective amount of a member selected from the group consisting of organic peroxides and sulfur and heating the resulting mixture in a mold to form a hard polyurethane plastic.

2. The product of the process of claim 1.

3. A process for the preparation of hard polyurethane plastics which comprises mixing an isocyanate-modified prepolymer prepared by a process which comprises reacting an organic polyisocyanate with an excess of an organic compound containing at least two active hydrogen containing groups as determined by the Zerewitinoff method and having a molecular weight of at least about 750 with an organic polyisocyanate, an effective amount of a member selected from the group consisting of an organic peroxide and sulfur and an effective amount of a cross-linking agent having at least two active hydrogen containing groups as determined by the Zerewitinoff method and having a molecular weight below about 500.

4. A process for the preparation of polyurethane plastics which comprises mixing and reacting an isocyanate-modified prepolymer prepared by a process which comprises reacting an organic polyisocyanate with an excess of an organic compound containing at least two active hydrogen containing groups as determined by the Zerewitinoff method and having a molecular weight of at least about 750, with an organic polyisocyanate and an organic peroxide, said organic peroxide being present in an amount of from about 1 to about 10% by weight based on the weight of the resulting mixture.

5. A process for the preparation of polyurethane plastics which comprises mixing and reacting an isocyanate-modified prepolymer prepared by a process which comprises reacting an organic polyisocyanate with an excess of an organic compound containing at least two active hydrogen containing groups as determined by the Zerewitinoff method and having a molecular weight of at least about 750, with an organic polyisocyanate and sulphur, said sulphur being present in an amount of from about 0.1 to about 10% by weight based on the weight of the resulting mixture.

6. A process for the preparation of polyurethane plastics which comprises mixing an organic polyisocyanate with a member selected from the group consisting of hydroxyl polyesters obtained from polycarboxylic acids and polyhydric alcohols, polyhydric polyalkylene ethers and polyhydric polythioethers in a first step to prepare a prepolymer having terminal —NCO groups and subsequently reacting said prepolymer with a member selected from the group consisting of water, polyhydric alcohols, polyamines and amino alcohols containing only one free amino group and only one free hydroxyl group in a quantity sufficient to react with all of the free —NCO groups and subsequently mixing the product of the second step with an organic polyisocyanate, an effective amount of a cross-linking agent having at least two active hydrogen containing groups as determined by the Zerewitinoff method and having a molecular weight below about 500 and an effective amount of a member selected from the group consisting of organic peroxides and sulfur and thereafter heating the mixture in a mold to produce a cured polyurethane plastic.

7. The process of claim 1, wherein the member selected from the group consisting of organic peroxides and sulfur is present in an amount of at least 0.1 percent by weight.

8. The process of claim 6 wherein the member selected from the group consisting of organic peroxides and sulfur is present in an amount of from about 0.1 to about 10 percent by weight.

References Cited by the Examiner
UNITED STATES PATENTS

| | | | |
|---|---|---|---|
| 2,625,531 | 1/1953 | Seeger | 260—75 |
| 2,929,794 | 3/1960 | Simon et al. | 260—75 |
| 2,953,539 | 9/1960 | Keplinger et al. | 260—75 |

FOREIGN PATENTS 748,697  5/1956  Great Britain.

OTHER REFERENCES

Saunders, "Polyurethanes Chemistry and Technology," pp. 273–314.

LEON J. BERCOVITZ, *Primary Examiner.*

MILTON STERMAN, NORMAN G. TORCHIN,
*Examiners.*